(12) United States Patent
Lee et al.

(10) Patent No.: US 9,208,565 B2
(45) Date of Patent: Dec. 8, 2015

(54) METHOD AND APPARATUS FOR ESTIMATING THREE-DIMENSIONAL POSITION AND ORIENTATION THROUGH SENSOR FUSION

(75) Inventors: Hyong Euk Lee, Yongin-si (KR); Sang Hyun Kim, Hwaseong-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 790 days.

(21) Appl. No.: 13/408,654

(22) Filed: Feb. 29, 2012

(65) Prior Publication Data

US 2013/0028469 A1 Jan. 31, 2013

(30) Foreign Application Priority Data

Jul. 27, 2011 (KR) ........................ 10-2011-0074389

(51) Int. Cl.
*G06K 9/00* (2006.01)
*G06T 7/00* (2006.01)

(52) U.S. Cl.
CPC ..... *G06T 7/0042* (2013.01); *G06T 2207/10028* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 8,116,519 | B2 * | 2/2012 | Ng-Thow-Hing et al. | ... 382/103 |
| 8,265,425 | B2 * | 9/2012 | Ng-Thow-Hing et al. | ... 382/291 |
| 8,310,656 | B2 * | 11/2012 | Zalewski | ........................ 356/29 |
| 8,313,379 | B2 * | 11/2012 | Ikeda et al. | ..................... 463/38 |
| 8,320,619 | B2 * | 11/2012 | Mathe | ................ G06K 9/00342 375/240.08 |
| 8,795,078 | B1 * | 8/2014 | Musick et al. | .................. 463/37 |
| 8,866,889 | B2 * | 10/2014 | Masalkar et al. | .. H04N 13/0022 348/46 |
| 2004/0239670 | A1 * | 12/2004 | Marks | .......................... 345/419 |
| 2006/0282873 | A1 * | 12/2006 | Zalewski et al. | ............. 725/133 |
| 2007/0200930 | A1 | 8/2007 | Gordon | |
| 2008/0080789 | A1 * | 4/2008 | Marks et al. | .................. 382/296 |

(Continued)

FOREIGN PATENT DOCUMENTS

| | | |
|---|---|---|
| JP | 2008-545206 | 12/2008 |
| JP | 2009-033366 | 2/2009 |

(Continued)

OTHER PUBLICATIONS

Wikipedia, "PlayStation Eye", Web article, last modified Jan. 20, 2011, 7 pages: from http://en.wikipedia.org/w/index.php?title=PlayStation_Eye].*

(Continued)

*Primary Examiner* — Jason Heidemann
(74) *Attorney, Agent, or Firm* — NSIP Law

(57) ABSTRACT

An apparatus and method of estimating a three-dimensional (3D) position and orientation based on a sensor fusion process. The method of estimating the 3D position and orientation may include determining a position of a marker in a two-dimensional (2D) image, determining a depth of a position in a depth image corresponding to the position of the marker in the 2D image to be a depth of the marker, estimating a 3D position of the marker calculated based on the depth of the marker as a marker-based position of a remote apparatus, estimating an inertia-based position and an inertia-based orientation by receiving inertial information associated with the remote apparatus, estimating a fused position based on a weighted sum of the marker-based position and the inertia-based position, and outputting the fused position and the inertia-based orientation.

26 Claims, 9 Drawing Sheets

(56) References Cited

U.S. PATENT DOCUMENTS

| | | | |
|---|---|---|---|
| 2008/0096654 A1* | 4/2008 | Mondesir et al. | 463/31 |
| 2008/0096657 A1* | 4/2008 | Benoist | 463/36 |
| 2009/0080699 A1* | 3/2009 | Ng-Thow-Hing et al. | 382/103 |
| 2009/0122146 A1* | 5/2009 | Zalewski et al. | 348/169 |
| 2009/0290758 A1* | 11/2009 | Ng-Thow-Hing et al. | 382/106 |
| 2010/0188396 A1 | 7/2010 | Mejdrich et al. | |
| 2011/0181703 A1* | 7/2011 | Kobayashi et al. | 348/46 |
| 2011/0183765 A1* | 7/2011 | Kobayashi et al. | 463/43 |
| 2011/0185309 A1* | 7/2011 | Challinor et al. | 715/784 |
| 2011/0210915 A1* | 9/2011 | Shotton et al. | 345/157 |
| 2011/0230263 A1* | 9/2011 | Ng | 463/31 |
| 2011/0304629 A1* | 12/2011 | Winchester | 345/473 |
| 2011/0306397 A1* | 12/2011 | Fleming et al. | 463/7 |
| 2011/0306398 A1* | 12/2011 | Boch et al. | 463/7 |
| 2011/0307260 A1* | 12/2011 | Zhang et al. | G06F 3/017 704/275 |
| 2011/0316853 A1* | 12/2011 | Bar-Zeev et al. | 345/420 |
| 2013/0163879 A1* | 6/2013 | Katz et al. | G06T 7/0044 382/195 |

FOREIGN PATENT DOCUMENTS

| | | |
|---|---|---|
| JP | 2009-041919 | 2/2009 |
| KR | 10-2007-0055210 | 5/2007 |

OTHER PUBLICATIONS

Wikipedia, ("PlayStation Move") ["PlayStation Move", Web article, last modified Jun. 25, 2011, 16 pages: from https://en.wikipedia.org/wiki/PlayStation_Move].*

* cited by examiner

METHOD AND APPARATUS FOR ESTIMATING THREE-DIMENSIONAL POSITION AND ORIENTATION THROUGH SENSOR FUSION

CROSS-REFERENCE TO RELATED APPLICATIONS

This application claims the priority benefit of Korean Patent Application No. 10-2011-0074389, filed on Jul. 27, 2011, in the Korean Intellectual Property Office, the disclosure of which is incorporated herein by reference.

BACKGROUND

1. Field

Example embodiments of the following description relate to a method and apparatus for estimating a three-dimensional (3D) position and orientation based on a sensor fusion process, and more particularly, to a method and apparatus for estimating a 3D position and orientation by fusing a result of position estimation, based on a marker and a result of position and orientation estimation based on inertial information.

2. Description of the Related Art

Conventionally, techniques that estimate a three-dimensional (3D) position and orientation of a moving object or target have been used in film, graphic and animation industries, and the like for sensing a motion of an object, a human body, an animal, and the like in a 3D space using an expensive and large-sized motion capture device.

As a motion sensing technique for consumer electronics (CE) associated with the game industry has begun to draw attention, many 3D position and orientation estimating methods using an inexpensive and small-sized motion capturing device have been developed.

A 3D position estimating method in a space is classified into a few methods, namely a method based on a camera, a method based on an infrared light, a method based on an inertial sensor, and the like.

According to the method based on the camera, locations of markers or light sources formed in images obtained from a plurality of two-dimensional (2D) cameras are transformed into a 3D position in a space. In this case, performance is dependent on the resolution of the cameras, sizes of the markers, and the like, and thus, the method may be problematic when performing high precision sensing.

According to a method based on an ultrasonic wave, a distance is calculated by measuring a time of flight (TOF) corresponding to a time taken for an ultrasonic wave to travel from a transmitting unit to a receiving unit and using the fact that ultrasonic waves propagate at the speed of sound, that is, about 340 meters per second (m/s). The 3D position is calculated based on a triangulation process, for example, after obtaining at least three pieces of distance information obtained at the same point of view. The method based on the ultrasonic wave may perform a high precision sensing using a device that is relatively less expensive than devices with a high cost, such as cameras. However, simultaneous transmission of ultrasonic waves is difficult to realize due to inter-sound wave interference, which presents a difficulty in estimating a position with respect to a moving object in real time. The problem is due to an attenuation time of an ultrasonic wave signal, that is, about 100 milliseconds (ms) taken over a distance of 3 meters (m).

According to the method based on the inertial sensor, the 3D position is calculated by applying integration to an acceleration component computed, based on an acceleration and a gravity acceleration, obtained through an accelerometer sensor and a gyro-sensor, and an angular velocity. However, the method based on the inertia is able to perform position estimating within a short time period and is not appropriate for long-time position estimating, since errors are accumulated over time.

SUMMARY

The foregoing and/or other aspects are achieved by providing an apparatus for estimating a position and an orientation, the apparatus including a marker determining unit to determine a position of a marker in a two-dimensional (2D) image, a depth determining unit to determine a position corresponding to the position of the marker, in a depth image obtained by photographing the same area as the 2D image, and to determine a depth of the corresponding position in the depth image to be a depth of the marker, and a marker-based estimator to estimate, based on the depth of the marker, a marker-based position indicating a three-dimensional (3D) position of the marker.

The marker-based estimator may determine a 2D position value excluding the depth of the marker, based on the depth of the marker, a field of view at which the 2D image and the depth image are photographed, and a distance from a predetermined reference position to the marker.

The depth determining unit may calculate an average depth of a predetermined area set based on the corresponding position in the depth image, and determines the average depth to be the depth of the marker.

The predetermined area may correspond to an ambient area of the marker, which is an area excluding a central area affected by a light of the marker from a predetermined radius set based on the corresponding position in the depth image.

The 2D image may be a 2D image photographed when the marker is activated, and the depth image may be an image including depth information, photographed when the marker is inactivated within a predetermined period of time after the 2D image is photographed.

The marker may emit or reflect a light source, and a photographed light source may be discerned within the 2D image.

The marker may emit or may reflect an infrared light, the 2D image may be an infrared light image photographed based on an infrared light, and the depth image may be an image including depth information, photographed based on an infrared light.

The apparatus may further include an inertia-based estimator to estimate an inertia-based position and an inertia-based orientation of a remote apparatus, by receiving inertial information associated with the remote apparatus, and a fusion estimator to estimate a fused position based on a weighted-sum of the marker-based position and the inertia-based position.

When the weighted-sum is calculated, the fusion estimator may assign a relatively higher weight to the inertia-based position than to the marker-based position, as a movement speed of the remote apparatus decreases.

When the weighted-sum is calculated, the fusion estimator may assign a relatively higher weight to the inertia-based position than to the marker-based position, as a distance from the remote apparatus increases.

When a movement speed of the remote apparatus is lower than a predetermined speed while the weighted-sum is being calculated, the fusion estimator may estimate the inertia-based position to be the fused position.

The inertia-based estimator may estimate the inertia-based position and the inertia-based orientation using a variance of inertial information, and the variance may be determined, based on a latest estimated fused position or a latest estimated marker-based position.

The fusion estimator may perform estimating the marker-based position as the fused position at a point in time when the marker-based position exists, and estimating the inertia-based position as the fused position at a point in time when the marker-based position is absent.

The foregoing and/or other aspects are achieved by providing a method of estimating a position and an orientation, the method including determining a position of a marker in a two-dimensional (2D) image, determining a position corresponding to the position of the marker, in a depth image obtained by photographing the same area as the 2D image, determining a depth of the corresponding position in the depth image to be a depth of the marker, and estimating, based on the depth of the marker, a marker-based position of a remote apparatus, which indicates a three-dimensional (3D) position of the marker.

The foregoing and/or other aspects are achieved by providing a system for estimating a position and an orientation, the system including a transmitting apparatus comprising at least one marker generator to generate and output a marker, a receiving apparatus to photograph a two-dimensional (2D) image and a depth image of the same area as the 2D image, a remote apparatus comprising one of the transmitting apparatus and the receiving apparatus, and an estimating apparatus to determine a position of the marker in the 2D image, to determine, in the depth image, a position corresponding to the position of the marker, determining a depth of the corresponding position in the depth image to be a depth of the marker, and to estimate, based on the depth of the marker, a marker-based position of the remote apparatus, which indicates a three-dimensional (3D) position of the marker.

The receiving apparatus may include a depth sensor that photographs the 2D image and the depth image.

The receiving apparatus may include an image sensor to photograph the 2D image and a depth sensor to photograph the depth image.

The remote apparatus may further include an inertia sensor unit to measure inertial information, and the estimating apparatus may estimate an inertia-based position and an inertia-based orientation of the remote apparatus using the inertial information, may estimate a fused position of the remote apparatus by fusing the marker-based position and the inertia-based position; and outputs the fused position and the inertia-based orientation of the remote apparatus.

Example embodiments may include an apparatus and method that estimates a marker-based position using a two-dimensional (2D) image and a depth image, estimates an inertia-based position and an inertia-based orientation based on inertial information, estimates a fused position of a remote apparatus by fusing the marker-based position and the inertia-based position, and outputs the fused position and the inertia-based orientation of the remote apparatus and thus, estimates a three-dimensional (3D) position and orientation. Since relatively small sensors are fused a system for estimating the 3D position and orientation may be embodied at a low cost and may be minimized, and the 3D position and orientation estimated through sensor fusion may have a high accuracy.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
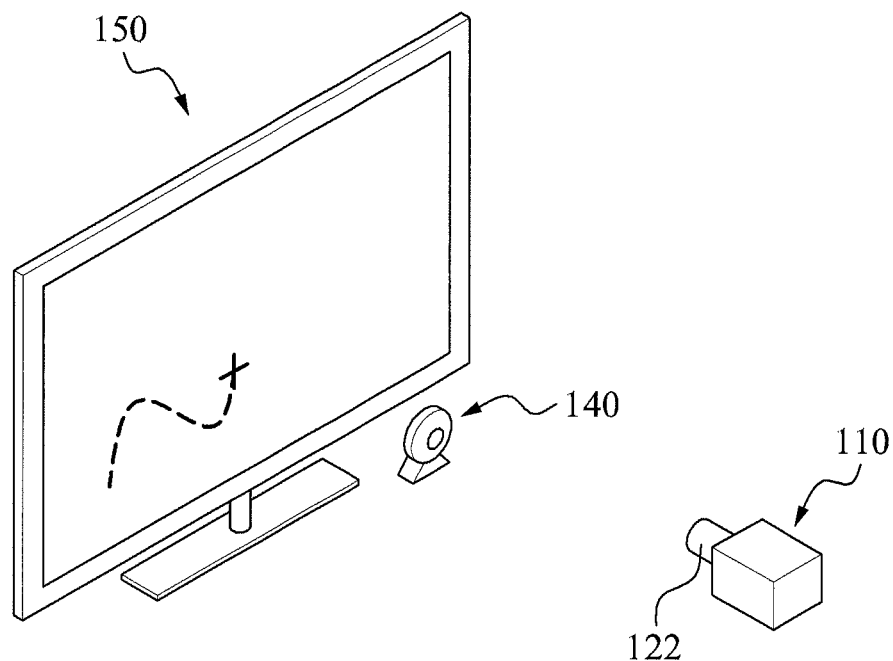
FIG. 1 illustrates a system that estimates a three-dimensional (3D) position and orientation of a remote apparatus, based on a sensor fusion process, according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a system that estimates a three-dimensional (3D) position and orientation of a remote apparatus based on a sensor fusion process, according to example embodiments.

Referring to FIG. 1, a system that estimates a 3D position and orientation of a remote apparatus 110 based on a sensor fusion process includes the remote apparatus 110, a receiving apparatus 140, and an estimating apparatus 150.

The remote apparatus 110 may include an inertia sensor unit 130 and a marker generator 122, which generates and outputs a marker.

The receiving apparatus 140 may include an image sensor 142 to photograph a two-dimensional (2D) image and a depth sensor 143 to photograph a depth image.

The estimating apparatus 150 may estimate a marker-based position, based on the 2D image and the depth image, may estimate an inertia-based position and an inertia-based orientation, using inertial information, may estimate a fused position of the remote apparatus 110 by fusing the marker-based position and the inertia-based position, and may output the fused position and the inertia-based orientation of the remote apparatus 110 so as to estimate a 3D position and orientation. The estimating apparatus 140 may output the estimated position to be displayed on a display as illustrated in FIG. 1.

Figure 2:
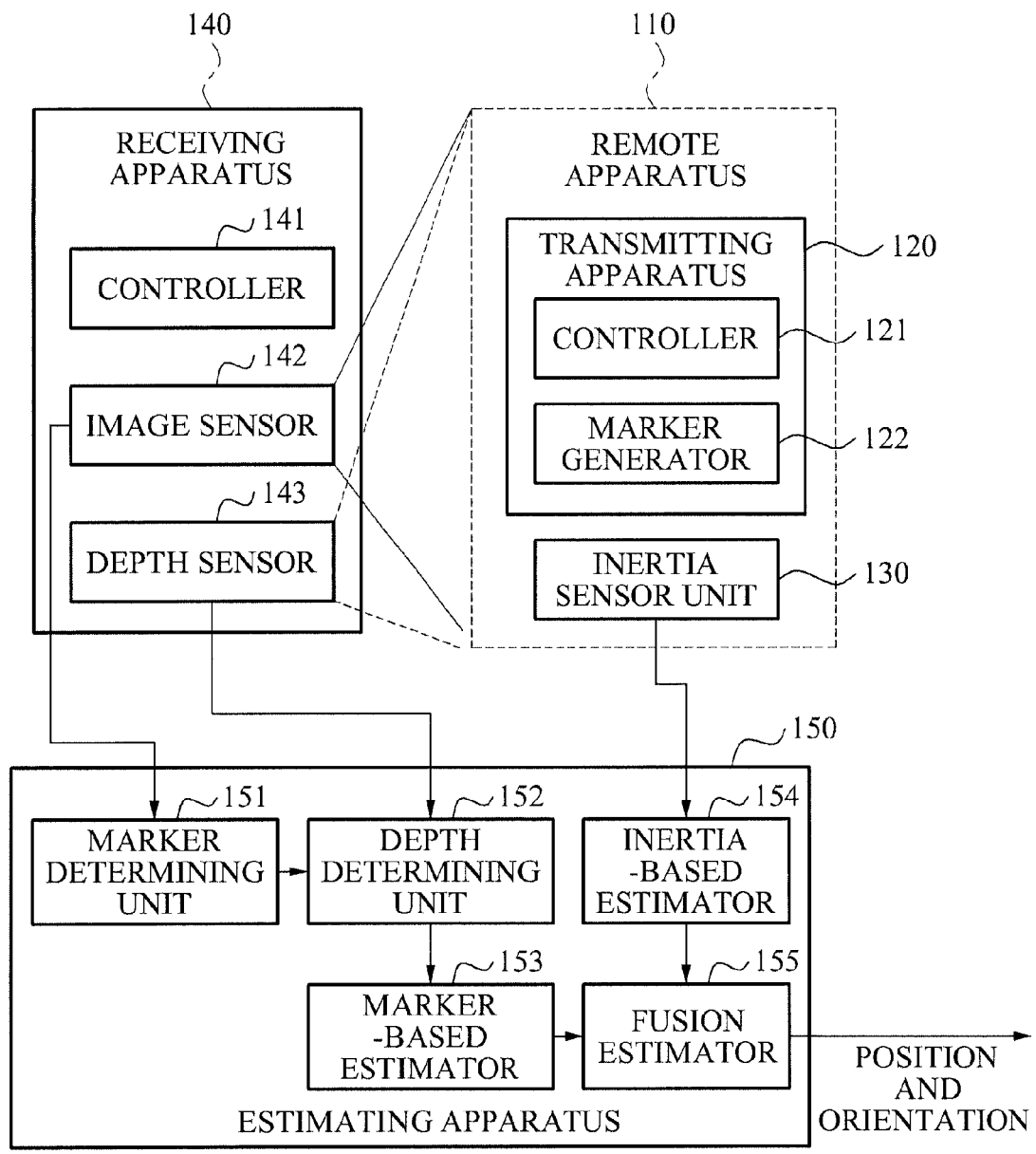
FIG. 2 illustrates a configuration of a system that estimates a 3D position and orientation of a remote apparatus based on a sensor fusion process, according to example embodiments.

FIG. 2 illustrates a configuration of a system that estimates a 3D position and orientation of a remote apparatus based on a sensor fusion process, according to example embodiments.

Referring to FIG. 2, the system that estimates a 3D position and orientation based on a sensor fusion process includes the remote apparatus 110, a transmitting apparatus 120, the receiving apparatus 140, and the estimating apparatus 150.

The remote apparatus 110 may be a target apparatus of which a position and an orientation is to be estimated, and may include the transmitting apparatus 120 and an inertial sensor unit 130 to measure inertial information. Here, the inertia sensor unit 130 may be configured to include at least one of an accelerometer sensor, a geo-magnetic sensor, and a gyro-sensor. The inertial information may include a tri-axial acceleration, a tri-axial gravity acceleration, and a tri-axial angular velocity. Even though the remote apparatus 110 of FIG. 2 includes the transmitting apparatus 120, the remote apparatus 110 may include the receiving apparatus 140 instead of the transmitting apparatus 120. That is, the remote apparatus 110 may include the transmitting apparatus 120 or the receiving apparatus 140.

The transmitting apparatus 120 may include a controller 121 and at least one marker generator 122.

The marker generator 122 may generate and output a marker. In this example, the marker may be a light source recognized as a marker, and a representative example of the light source that is recognized as a marker may be an infrared light. Also, the marker generator 122 may operate as an infrared light transmitting unit of a remote controller that controls an electric device.

The marker generator 122 may use an infrared light, having an optical wavelength of approximately 700 nanometers (nm) to 300 nm so that a magnitude of a light source is sensed by the image sensor 142, as is, without being affected by an ambient light source, for example, fluorescent light, sun light, and the like.

The controller 121 may control the marker generator 122. The controller 121 may control the marker generator 122 to be activated or inactivated, so that the marker generator 122 is activated during a predetermined period of time and is inactivated during another predetermined period of time. Since the marker output from the marker generator 122 may affect, as interference, depth information included in a depth image, the controller 121 may control the marker generator 122 to be inactivated when the depth image is photographed.

The transmitting apparatus 120 may transmit a marker after modulating the marker at a predetermined frequency, using a modulator (not illustrated), as occasion demands.

The receiving apparatus 140 may include a controller 141, an image sensor 142, and a depth sensor 143.

The image sensor 142 may photograph a 2D image. In this example, the image sensor 142 may photograph an image in which a light source may be discerned. In this example, a representative light source may be an infrared light. That is, the image sensor 142 may be a device that photographs a 2D image, based on an infrared light.

The depth sensor 143 may photograph a depth image of the same area as the 2D image. In this example, the depth sensor 143 may be a device that photographs a depth image, based on an infrared light.

Although the receiving apparatus 140 of FIG. 2 photographs the 2D image and the depth image using the image sensor 142 and the depth sensor 143, respectively, in the present embodiment, the receiving apparatus 140 may photograph the 2D image and the depth image using a single device. For example, a single depth sensor may photograph a 2D image and a depth image.

The controller 141 may control the image sensor 142 and the depth sensor 143. The controller 141 may control the image sensor 142 and the depth sensor 143 to simultaneously photograph images, or may control the image sensor 142 to photograph an image when the marker is activated and may control the depth sensor 143 to photograph an image when the marker is inactivated.

When the modulated marker is output from the transmitting apparatus 120, the receiving apparatus 140 may receive the modulated marker and may demodulate the modulated marker using a demodulator (not illustrated).

The estimating apparatus 150 may estimate a position and an orientation using inertial information received from the inertia sensor unit 130, the 2D image received from the image sensor 142, and the depth image received from the depth sensor 143.

The estimating apparatus 150 may include a marker determining unit 151, a depth determining unit 152, a marker-based estimator 153, an inertia-based estimator 154, and a fusion estimator 155.

The marker determining unit 151 may discern a marker from the 2D image photographed by the image sensor 142, and may determine a position of the marker in the 2D image.

The depth determining unit 152 may determine, in the depth image photographed by the depth sensor 143, a position corresponding to the position of the marker determined by the marker determining unit 151, and may determine a depth of the corresponding position in the depth image to be a depth of the marker.

The depth determining unit 152 may calculate an average depth of a predetermined area set based on the corresponding position in the depth image, and may determine the average depth to be the depth of the marker. Hereinafter, an example that determines the predetermined area will be described with reference to FIG. 4.

Figure 4:
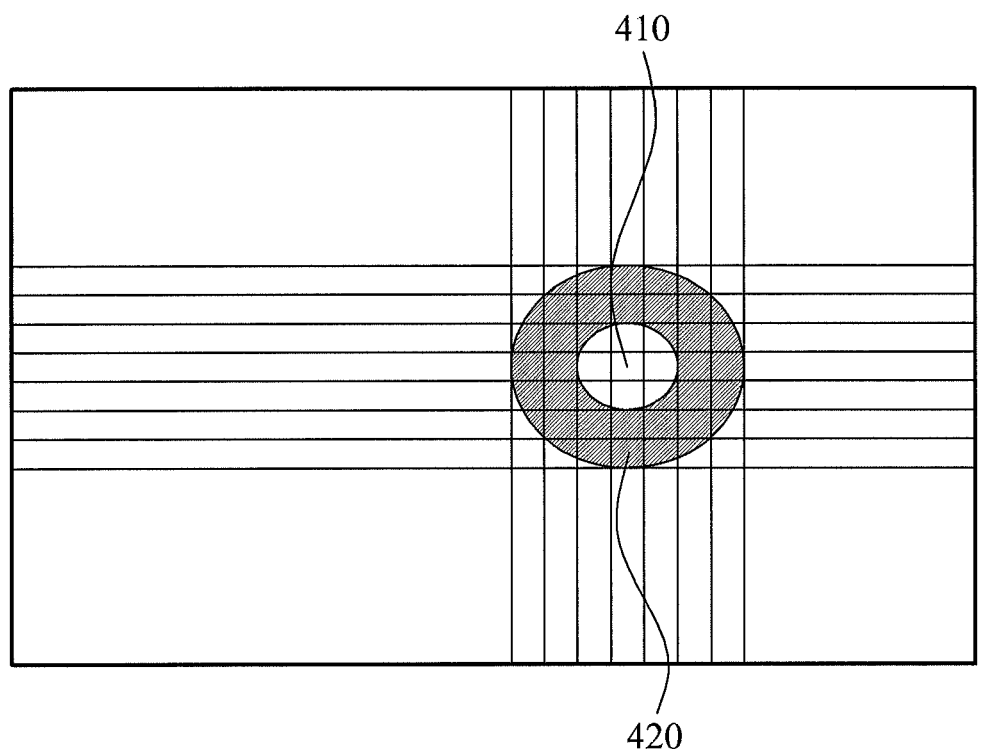
FIG. 4 illustrates an example that determines a depth of a marker based on an average depth of a predetermined area, according to example embodiments.

FIG. 4 illustrates an example that determines a depth of a marker, based on an average depth of a predetermined area, according to example embodiments Referring to FIG. 4, the predetermined area may correspond to an ambient area 420 of the marker, which is an area excluding a central area 410 affected by a light of the marker from a predetermined radius set, based on a position in a depth image corresponding to a position of the marker.

Since the marker may affect, as interference, depth information included in the depth image, the depth determining unit 152 may determine the depth of the marker based on the average depth of the predetermined area.

When the marker generator 122 is not dynamically activated or inactivated, the depth determining unit 152 may determine the depth of the marker based on the average depth of the predetermined area so as to improve an accuracy of the depth of the marker. Although the marker generator 122 is dynamically activated, the depth determining unit 152 may determine the depth of the marker using the average depth of the predetermined area.

The marker-based estimator 153 may estimate, based on the depth of the marker, a marker-based position corresponding to a 3D position of the marker.

Hereinafter, a method that estimates the marker-based position in the marker-based estimator 153 will be described with reference to FIG. 3.

Figure 3:
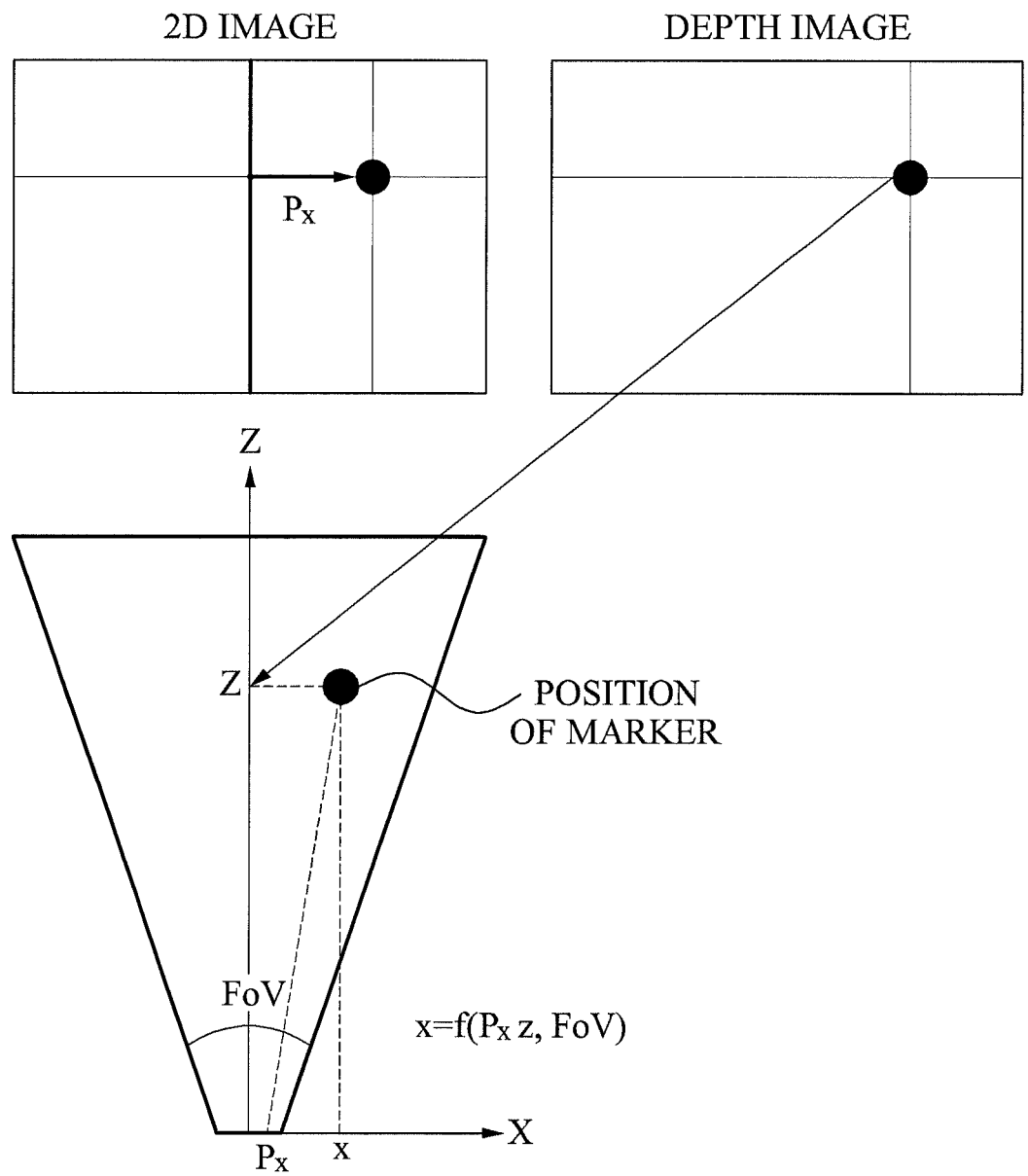
FIG. 3 illustrates a method of estimating a marker-based position based on a two-dimensional (2D) image and a depth image, according to example embodiments.

FIG. 3 illustrates a method of estimating a marker-based position based on a 2D image and a depth image, according to example embodiments.

Referring to FIG. 3, the marker-based estimator 153 may determine a 2D position value, excluding a depth of a marker (Z), based on Z, a field of view (FoV) at which the 2D image and the depth image are photographed, and a distance ($P_x$) from a predetermined reference position to the marker.

The inertia-based estimator 154 may receive inertial information measured by the inertia sensor unit 130, and may estimate an inertia-based position and an inertia-based orientation of the remote apparatus 110.

The inertia-based position estimated by the inertia-based estimator 154 may be information estimated using a variance of the received inertial information, and the variance is determined using, as a reference position, a latest estimated fused position estimated by the fusion estimator 155 or a latest estimated marker-based position estimated by the marker-based estimator 153. In this instance, an error may be accumulated when the inertial-based estimator 154 estimates a position. Accordingly, as a movement of the remote apparatus 110 decreases and a point in time of estimating a position is nearer than a point in time of measuring the reference position, the position is more accurately measured.

The fusion estimator 155 may estimate a fused position, based on a weighted-sum of a marker-based position and an inertia-based position, and may output the fused position and the inertia-based orientation.

When the weighted-sum is calculated, the fusion estimator 155 may assign a relatively higher weight to the inertia-based position than to the marker-based position, as a movement speed of the remote apparatus 110 decreases.

When the weighted-sum is calculated, the fusion estimator 155 may assign a relatively higher weight to the inertia-based position than to the marker-based position, as a distance from the remote apparatus 110 increases.

When the remote apparatus 110 moves slightly, that is, when the movement speed is lower than a predetermined speed, while the weighted-sum is being calculated, the fusion estimator 155 may estimate the inertia-based position as the fused position.

The fusion estimator 155 may estimate the marker-based position as the fused position at a point in time in which the marker-based position exists, and may estimate the inertia-based position as the fused position at a point in time during which the marker-based position is absent.

Hereinafter, a method that estimates a 3D position and an orientation of a remote apparatus, based on a sensor fusion process, will be described.

Figure 5:
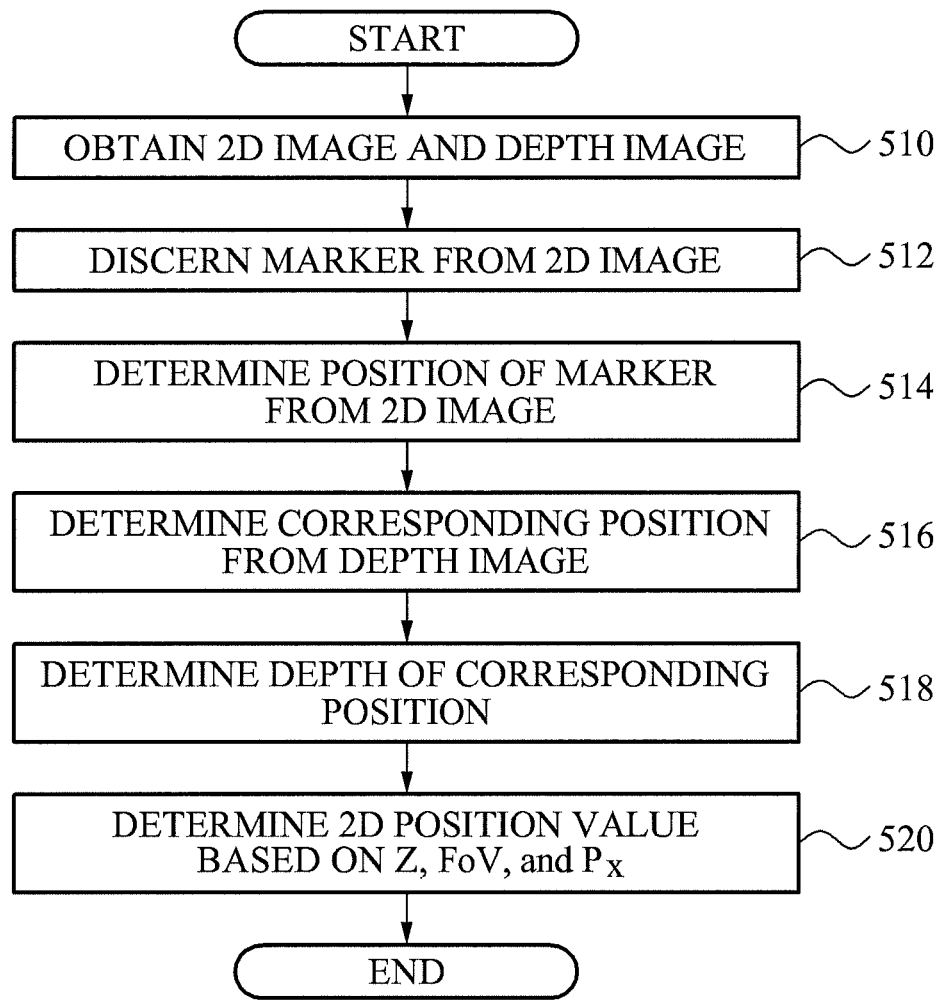
FIG. 5 is a flowchart illustrating an example that estimates a position of a remote apparatus based on a marker, when a two-dimensional (2D) image and a depth image are simultaneously photographed, according to example embodiments.

FIG. 5 illustrates an example that estimates a position of a remote apparatus based on a marker, when a 2D image and a depth image are simultaneously photographed, according to example embodiments.

In operation 510, an estimating apparatus may obtain the 2D image and the depth image from a receiving apparatus.

In operation 512, the estimating apparatus may discern a marker from the 2D image.

In operation 514, the estimating apparatus may determine a position of the marker in the 2D image.

In operation 516, the estimating apparatus may determine a position corresponding to the position of the marker, in the depth image.

In operation 518, the estimating apparatus may determine a depth of the corresponding position in the depth image.

In operation 520, the estimating apparatus may determine a 2D position value excluding Z, based on Z, FoV at which the 2D image and the depth image are photographed, and $P_x$ from a predetermined reference position to the marker.

Figure 6:
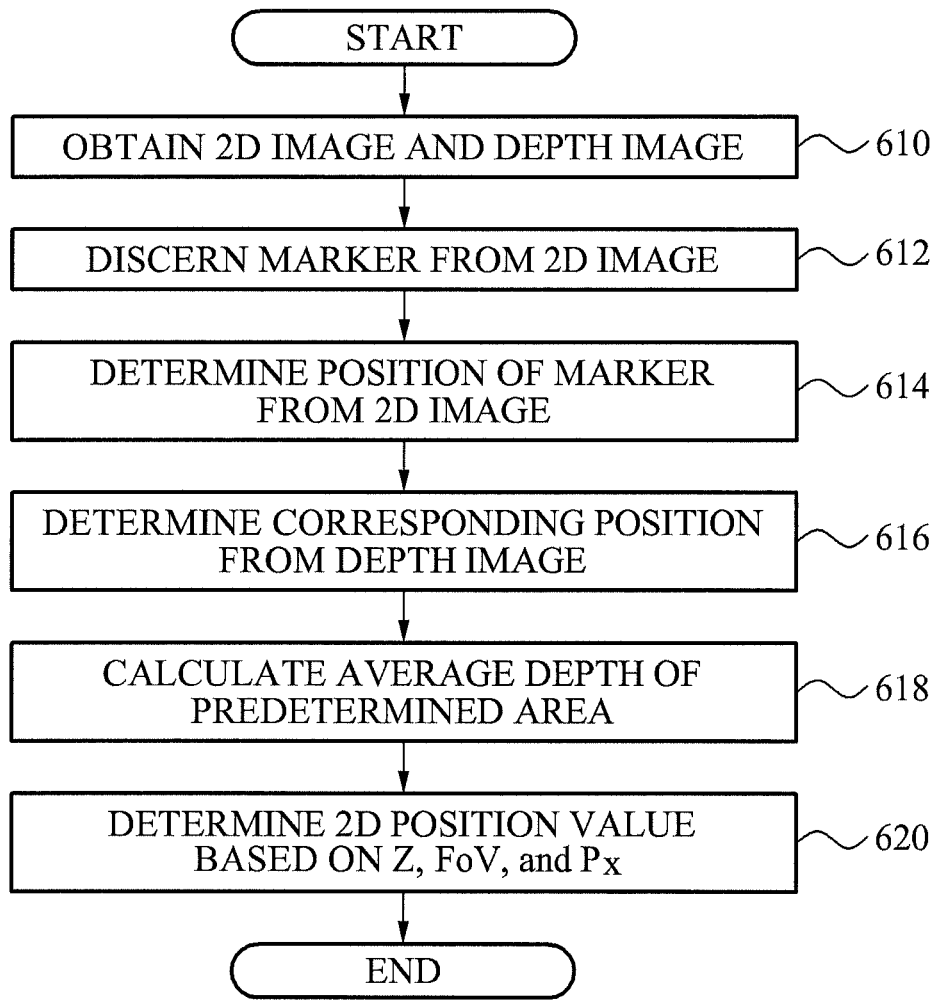
FIG. 6 is a flowchart illustrating another example that estimates a position of a remote apparatus based on a marker, when a 2D image and a depth image are simultaneously photographed, according to example embodiments.

FIG. 6 illustrates another example that estimates a position of a remote apparatus based on a marker, when a 2D image and a depth image are simultaneously photographed, according to example embodiments.

In operation 610, an estimating apparatus may obtain the 2D image and the depth image from a receiving apparatus.

In operation 612, the estimating apparatus may discern a marker in the 2D image.

In operation 614, the estimating apparatus may determine a position of the marker in the 2D image.

In operation 616, the estimating apparatus may determine a position corresponding to the position of the marker, in the depth image.

In operation 618, the estimating apparatus may calculate an average depth of a predetermined area set based on the corresponding position in the depth image and may determine the average depth to be Z. In this example, the predetermined area may correspond to a predetermined radius set, based on the corresponding position, or may correspond to an ambient area of the marker, which is an area excluding a central area affected by a light of the marker from the predetermined radius set, based on the corresponding position.

In operation 620, the estimating apparatus may determine a 2D position value excluding Z, based on Z, FoV at which the 2D image and the depth image are photographed, and $P_x$ from a predetermined reference position to the marker.

Figure 7:
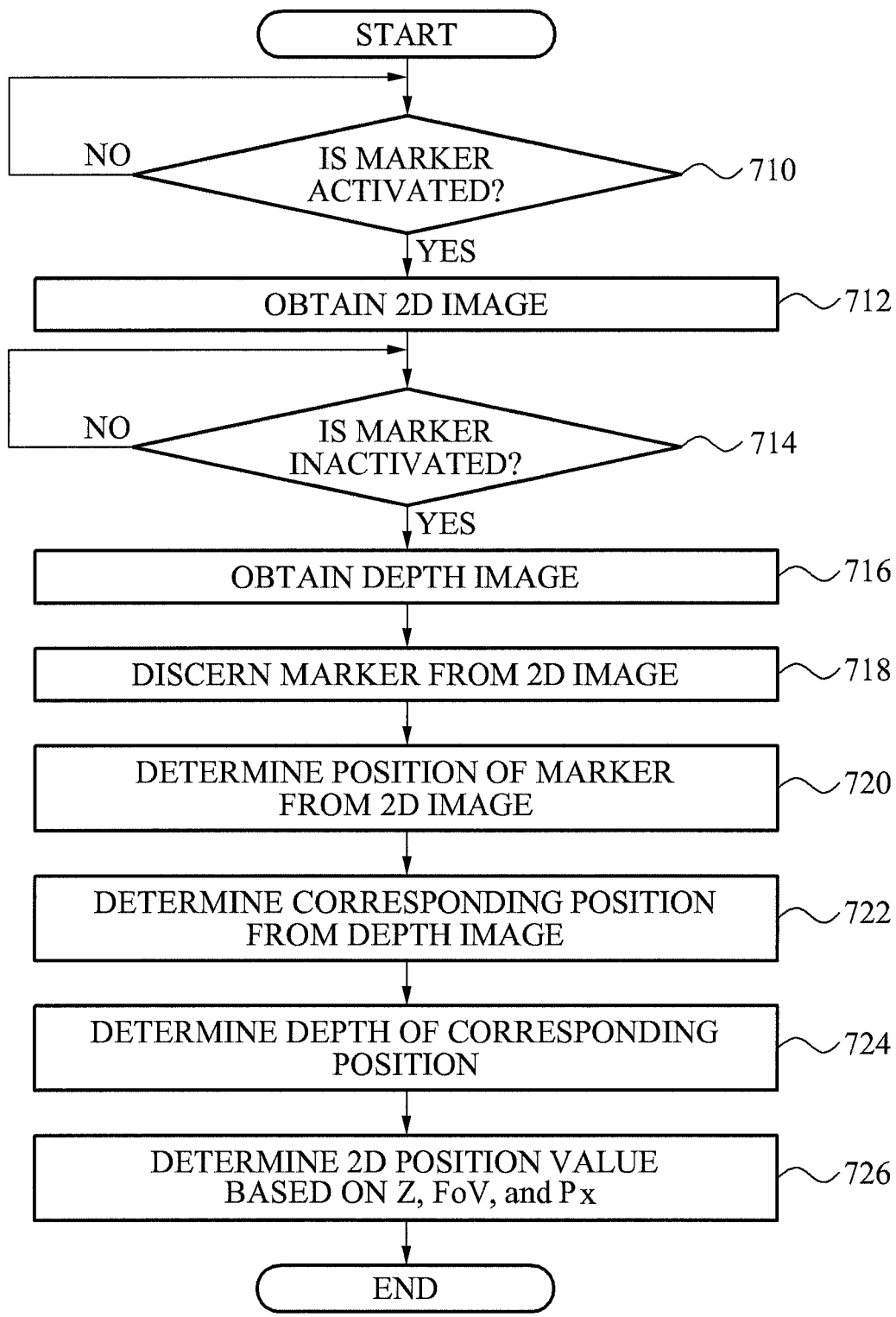
FIG. 7 is a flowchart illustrating an example that estimates a position of a remote apparatus based on a marker, by activating or inactivating the marker, according to example embodiments.

FIG. 7 illustrates an example that estimates a position of a remote apparatus, based on a marker, by activating or inactivating the marker, according to example embodiments.

When the marker is activated in operation 710, an estimating apparatus may obtain a 2D image from a receiving apparatus in operation 712.

Subsequently, when the estimating apparatus is inactivated in operation 714, the estimating apparatus obtains, from the receiving apparatus, a depth image of same area as the 2D image.

In operation 718, the estimating apparatus may discern a marker in the 2D image.

In operation 720, the estimating apparatus may determine a position of the marker in the 2D image.

In operation 722, the estimating apparatus may determine a position corresponding to the position of the marker in the depth image.

In operation 724, the estimating apparatus may determine a depth of the corresponding position in the depth image.

In operation 726, the estimating apparatus may determine a 2D position value excluding Z, based on Z, FoV at which the 2D image and the depth image are photographed, and $P_x$ from a predetermined reference position to the marker.

Figure 8:
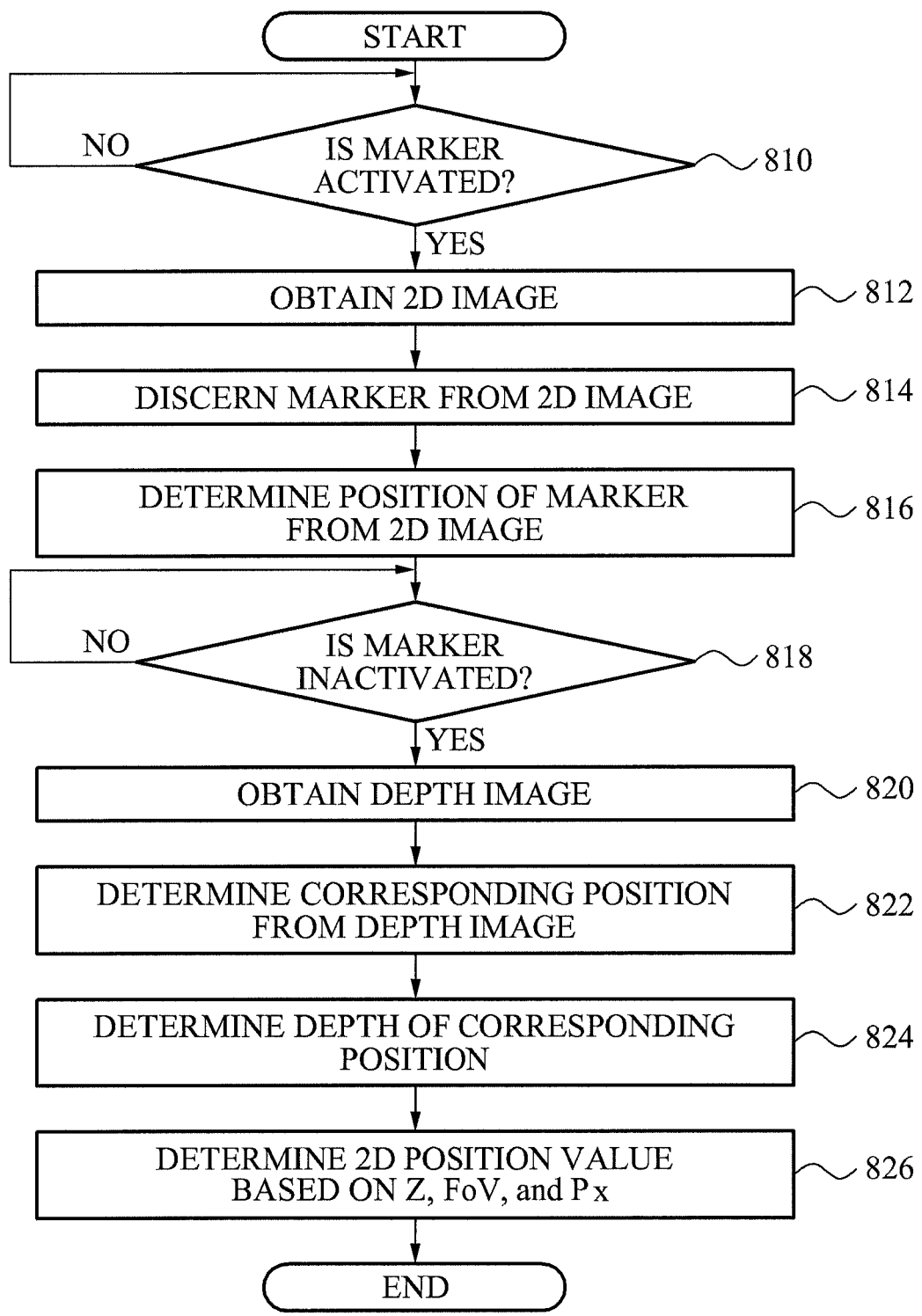
FIG. 8 is a flowchart illustrating another example that estimates a position of a remote apparatus based on a marker, by activating or inactivating the marker, according to example embodiments.

FIG. 8 illustrates another example that estimates a position based on a marker by activating or inactivating the marker, according to example embodiments.

When the marker is activated in operation 810, an estimating apparatus may obtain a 2D image from a receiving apparatus in operation 812.

In operation 814, the estimating apparatus may discern a marker in the 2D image.

In operation 816, the estimating apparatus may determine a position of the marker in the 2D image.

Subsequently, when the marker is inactivated in operation 818, the estimating apparatus may obtain, from the receiving apparatus, a depth image of the same area as the 2D photograph in operation 820.

In operation 822, the estimating apparatus may determine a position corresponding to the position of the marker, in the depth image.

In operation 824, the estimating apparatus may determine a depth of the corresponding position in the depth image.

In operation 826, the estimating apparatus may determine a 2D position value excluding Z, based on Z, FoV at which the 2D image and the depth image are photographed, and $P_x$ from a predetermined reference position to the marker.

Figure 9:
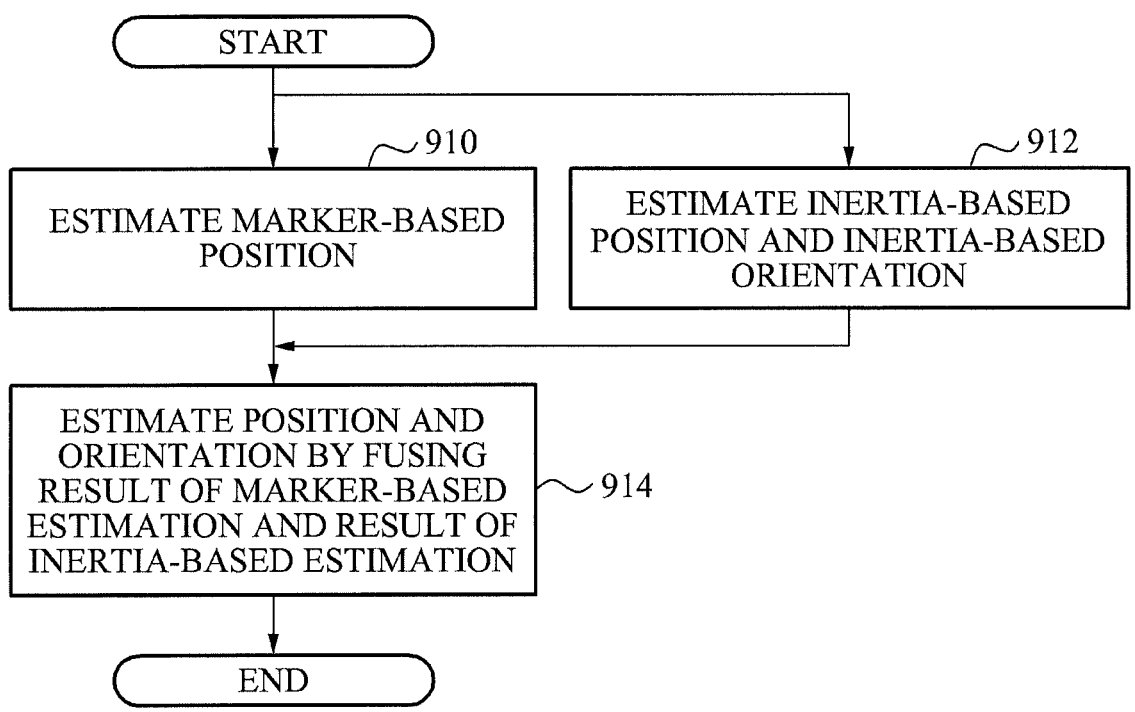
FIG. 9 is a flowchart illustrating a process that fuses a result of marker-based estimation and a result of inertia-based estimation, according to example embodiments.

FIG. 9 illustrates a process that fuses a result of marker-based estimation and a result of inertia-based estimation, according to example embodiments.

In operation 910, an estimating apparatus may estimate a marker-based position of a remote apparatus based on the methods described with reference to FIGS. 5 through 8.

In operation 912, the estimating apparatus may receive inertial information associated with the remote apparatus, and may estimate an inertia-based position and an inertia-based orientation of the remote apparatus. In this example, the inertia-based position may be information estimated based on a variance of the received inertial information, and the variance is determined using, as a reference position, a latest estimated fused position estimated by the fusion estimator or a latest estimated marker-based position estimated by the marker-based estimator.

In operation 914, the estimating apparatus may estimate a fused position based on a weighted-sum of the marker-based position and the inertia-based position, and may output the fused position and the inertia-based orientation.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for estimating a position and an orientation, the apparatus comprising:
    one or more processors configured to
        determine a position of a marker in a two-dimensional (2D) image;
        determine, in a depth image, a position corresponding to the position of the marker in the 2D image, and to determine a depth of the corresponding position in the depth image to be a depth of the marker; and
        estimate, based on the depth of the marker, a marker-based position indicating a three-dimensional (3D) position of the marker,
    wherein the one or more processors are further configured to determine a 2D position value excluding the depth of the marker, based on the depth of the marker, a field of view at which the 2D image and the depth image are photographed, and a distance from a predetermined reference position to the marker.

2. The apparatus of claim 1, wherein the one or more processors are further configured to calculate an average depth of a predetermined area set based on the corresponding position in the depth image, and determines the average depth to be the depth of the marker.

3. The apparatus of claim 2, wherein the predetermined area corresponds to an ambient area of the marker, which is an area excluding a central area affected by a light of the marker from a predetermined radius set, based on the corresponding position in the depth image.

4. The apparatus of claim 1, wherein:
    the 2D image is a 2D image photographed when the marker is activated; and
    the depth image is an image including depth information, of the same area as the 2D image, photographed when the marker is inactivated within a predetermined period of time after the 2D image is photographed.

5. The apparatus of claim 1, wherein:
    the marker emits or reflects a light source; and
    a photographed light source is discerned within the 2D image.

6. The apparatus of claim 1, wherein:
    the marker emits or reflects an infrared light;
    the 2D image is an infrared light image photographed, based on an infrared light; and
    the depth image is an image including depth information, photographed based on an infrared light.

7. The apparatus of claim 1, wherein the one or more processors are further configured to
    estimate an inertia-based position and an inertia-based orientation of a remote apparatus, by receiving inertial information associated with the remote apparatus; and
    estimate a fused position, based on a weighted-sum of the marker-based position and the inertia-based position.

8. The apparatus of claim 7, wherein, when the weighted-sum is calculated, the fusion estimator assigns a relatively higher weight to the inertia-based position than to the marker-based position, as a movement speed of the remote apparatus decreases.

9. The apparatus of claim 7, wherein, when the weighted-sum is calculated, the fusion estimator assigns a relatively higher weight to the inertia-based position than to the marker-based position, as a distance from the remote apparatus increases.

10. The apparatus of claim 7, wherein, when a movement speed of the remote apparatus is lower than a predetermined speed while the weighted-sum is being calculated, the fusion estimator estimates the inertia-based position as the fused position.

11. The apparatus of claim 7, wherein the one or more processors are further configured to estimate the inertia-based position and the inertia-based orientation based on a variance of inertial information, and the variance is determined based on a latest estimated fused position or a latest estimated marker-based position.

12. The apparatus of claim 7, wherein the one or more processors are further configured to:
    estimate the marker-based position as the fused position at a point in time when the marker-based position exists; and
    estimate the inertia-based position as the fused position at a point in time when the marker-based position is absent.

13. A method of estimating a position and an orientation, the method comprising:
    determining a position of a marker in a two-dimensional (2D) image;
    determining a position corresponding to the position of the marker, in a depth image;
    determining a depth of the corresponding position in the depth image to be a depth of the marker; and
    estimating, based on the depth of the marker, a marker-based position of a remote apparatus, which indicates a three-dimensional (3D) position of the marker,
    wherein the estimating comprises determining the 3D position of the marker by calculating a 2D position value, excluding the depth of the marker, based on the depth of the marker, a field of view at which the 2D image and the depth image are photographed, and a distance from a predetermined reference position to the marker.

14. The method of claim 13, wherein the determining of the depth of the marker comprises:
calculating an average depth of a predetermined area set, based on the corresponding position in the depth image, and determining the average depth to be the depth of the marker.

15. The method of claim 14, wherein the predetermined area corresponds to an ambient area of the marker, which is an area excluding a central area affected by a light of the marker from a predetermined radius set based on the corresponding position in the depth image.

16. The method of claim 13, wherein:
the 2D image is a 2D image photographed when the marker is activated; and
the depth image is an image including depth information, of the same area as the 2D image, photographed when the marker is inactivated within a predetermined period of time after the 2D image is photographed.

17. The method of claim 13, further comprising:
estimating an inertia-based position and an inertia-based orientation of the remote apparatus, by receiving inertial information associated with the remote apparatus; and
estimating a fused position based on a weighted-sum of the marker-based position and the inertia-based position; and
outputting the fused position and the inertia-based orientation.

18. The method of claim 17, wherein, when the weighted-sum is calculated, assigning a relatively higher weight to the inertia-based position than to the marker-based position, as a movement speed of the remote apparatus decreases.

19. The method of claim 17, wherein, when the weighted-sum is calculated, assigning a relatively higher weight to the inertia-based position than to the marker-based position, as a distance from the remote apparatus increases.

20. A system for estimating a position and an orientation, the system comprising:
at least one marker generator to generate and output a marker;
one more sensors configured to photograph a two-dimensional (2D) image and a depth image; and
one or more processors configured
to determine a position of the marker in the 2D image, to determine, in the depth image, a position corresponding to the position of the marker in the 2D image, determining a depth of the corresponding position in the depth image to be a depth of the marker, and to estimate, based on the depth of the marker, a marker-based position which indicates a three-dimensional (3D) position of the marker,
wherein the one or more processors are further configured to determine a 2D position value excluding the depth of the marker, based on the depth of the marker, a field of view at which the 2D image and the depth image are photographed, and a distance from a predetermined reference position to the marker.

21. The system of claim 20, wherein the one or more sensors comprises a depth sensor that photographs the 2D image and the depth image.

22. The system of claim 20, wherein the one or more sensors comprises an image sensor to photograph the 2D image and a depth sensor to photograph the depth image.

23. The system of claim 20, wherein the one or more processors are further configured to calculate an average depth of a predetermined area set, based on the corresponding position in the depth image, and determines the average depth to be the depth of the marker.

24. The system of claim 20, wherein:
the 2D image is a 2D image photographed when the marker is activated; and
the depth image is an image including depth information, of the same area as the 2D image, photographed when the marker is inactivated within a predetermined period of time after the 2D image is photographed.

25. The system of claim 20, wherein:
the marker is an infrared light marker that emits or reflects an infrared light;
the 2D image is an infrared light image photographed, based on an infrared light; and
the depth image is an image including depth information, photographed based on an infrared light.

26. The system of claim 20,
further comprising
an inertia sensor to measure inertial information, and
wherein the one or more processors are further configured to estimate an inertia-based position and an inertia-based orientation of the marker, based on the inertial information, estimates a fused position of the marker by fusing the marker-based position and the inertia-based position; and outputs the fused position and the inertia-based orientation of the marker.

* * * * *